April 30, 1968 E. J. BREITENBACH ETAL 3,381,290

FUNCTION GENERATOR SYSTEM

Filed Oct. 2, 1964

INVENTORS
EDWARD J. BREITENBACH
RALPH J. GUNDRUM
DONALD J. HINKEIN

BY Frederick D. Poag
ATTORNEY

United States Patent Office 3,381,290
Patented Apr. 30, 1968

3,381,290
FUNCTION GENERATOR SYSTEM

Edward J. Breitenbach, Kingston, Ralph J. Gundrum, Red Hook, and Donald J. Hinkein, Germantown, N.Y., assignors to International Business Machines Corporation, New York, N.Y., a corporation of New York Filed Oct. 2, 1964, Ser. No. 401,050
6 Claims. (Cl. 340—347)

ABSTRACT OF THE DISCLOSURE

The disclosed apparatus provides overdrive signals which, in combination with a reactive load, provide linear ramps for use as deflection signals in a CRT. Each bit of an input digital data source is provided with a logic channel wherein the most recent data bit and the next preceding data bit are stored. The conditions of these storages are compared parallel by bit by Exclusive Or and AND circuitry to determine whether the present value for the bit position is the same or higher or lower than the preceding value for that position. A digital-to-analog decoder has three channels for each bit order each weighted in accoradnce with the value of that order. Of the three, one channel yields the absolute value of the present bit of that order; another provides a positive overdrive signal when the comparison circuitry indicates that there has been a positive-going transition in that order; the third provides a quiescent signal which is interrupted if the transition is negative-going. The outputs of the decoder channels are summed on an analog basis.

Figure 1:
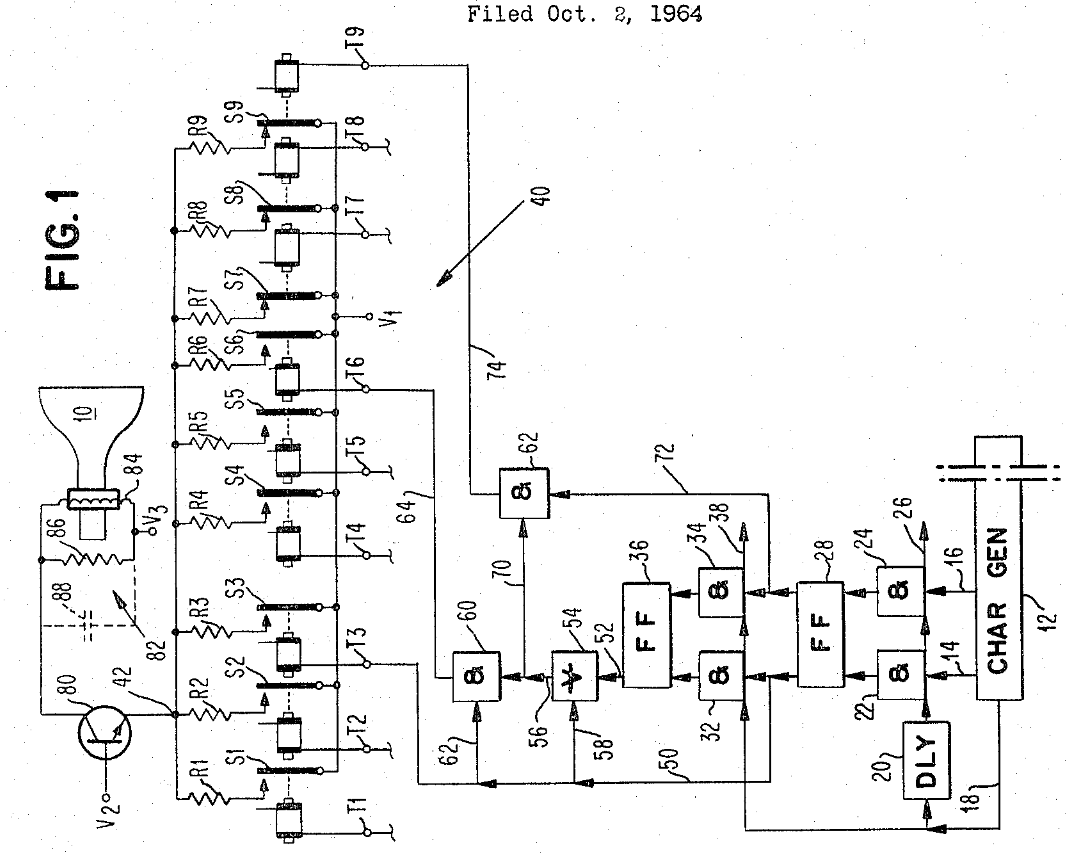

The present invention relates to function generator systems and more particularly to a system for generating electrical waveforms useful in deflecting an electron beam of a cathode ray tube or the like.

In cathode ray tube vector or character generating systems or character recognition systems, it is frequently necessary to deflect an electron beam in accordance with a predetermined scanning pattern. One example for such a requirement is found in cathode ray tube vector or character generation systems which operate in combination with a control device such as a data processing system to generate vectors on the screen of a cathode ray tube. In a CRT display system of the type above described, there may be provided means which specify the endpoint address of successive vectors to be generated in digital form, and intermediate means which generate the appropriate deflection signals from the specified addresses. Desirably, such deflection signals may approximate the form of a linear ramp.

One known system of the piror art utilizes a programmable current source to apply predetermined current steps to a delay network terminated in its characteristic impedance at the input side and in a short circuit on the output side, such that each input step causes a series of step voltages, having an over-drive portion of predetermined amplitude and duration, to be generated. These voltages, when integrated by reactive components having a relatively long time constant, cause the output signal to change to the newly specified values linearily with time. Since the steps are generated by operation of the delay line, good results are strongly dependent on that passive component.

In accordance with another approach to the problem, there has been provided a hybrid function generator comprising both digital and analog components for generating a ramp function which varies linearly with time. Digital input signals indicative of the endpoint addresses of the vector to be drawn or reproduced on a cathode ray tube display system are logically manipulated to derive difference values identifying the endpoint address of the vectors in relative form, i.e., the address of one endpoint relative to the address of the preceding endpoint. By employment of precise digital arithmetic, a predetermined multiple of the difference signal is generated, and then the resultant signal converted to a corresponding analog potential and applied to an integrating circuit for a predetermined controlled interval corresponding to the time constant of the intgerator. At the end of this predetermined interval, timing means are provided for reducing the voltage impressed on the integrator from an overdrive signal to the proper level deflection signal after a specified interval. This system enjoys the precision of digital calculation, but, since it employs an arithmetic unit, it is not always the most economical answer to the problem.

In accordance with the present invention, the desired step function is calculated in analog fashion by a decoder under the control of digital logic. As each new endpoint address is received, it is compared, bit by bit, to the previous one by simple "Exclusive Or" circuitry and it is then decoded in a fashion which is determined by that test. Thus contributions are made to the analog sum by each bit order in a manner which reflects the steady, or positive or negative going, status of that order, all in a single, simple operation.

Accordingly, a primary object of the present invention is to provide an improved function generator generally as aforesaid, employing analog elements under the control of digital logic.

Another object of the present invention is to provide an improved ramp generator system as aforesaid for generating linear ramp waveforms of variable slopes for the purpose of driving CRT deflection systems.

A further object of the present invention is to provide an improved function generator as aforesaid adapted to generate positive or negative ramp signals in a controlled time period.

Still another object of the present invention is to provide a system as aforesaid including digital logical controls and simple analog networks for generating overdrive signals for operating a reactive output circuit in a desired linear ramp fashion.

Another object of the present invention is to provide an improved digital-analog ramp generating system wherein an overdrive signal comprising a predetermined multiple of an input signal is derived coincidentally with the decoding of the input signal.

Another object of the present invention is to provide an improved ramp generator as aforesaid for generating a linear ramp function directly from digital information defining the treminal endpoints of succeessive vectors to be displayed.

The foregoing and other objects, features and advantages of the invention will be apparent from the following more particular description of the preferred embodiment of the invention, as illustrated in the accompanying drawings.

Figure 2A:
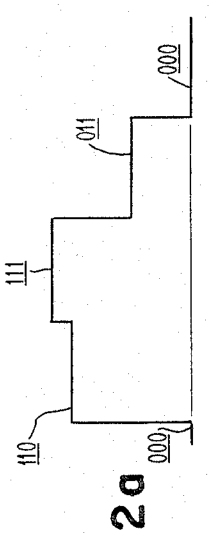
Figure 2B:
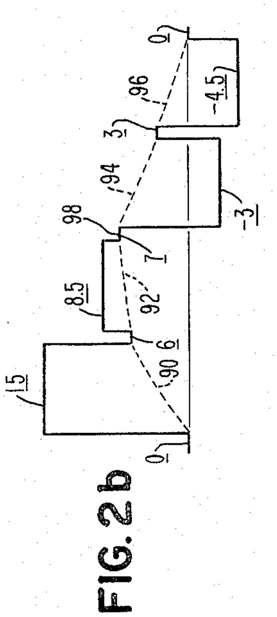
Figure 2C:
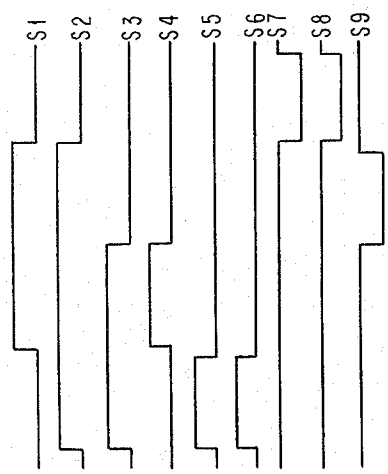

In the drawings:

FIGURE 1 is a fragmentary schematic diagram illustrative of a preferred embodiment of the subject invention; and FIGURES 2*a*, 2*b*, and 2*c* are coordinated timing diagrams illustrative of the operation of the system of FIG. 1.

Referring more particularly to the drawing, the system illustrated in FIG. 1 is adapted to execute successive deflections of the electron beam of a cathode ray tube 10 in accordance with successive terminal endpoint addresses of vectors as supplied in digital form from a source such as a character generator 12. It will be understood that the character generator 12 may be part of a data processing system or other apparatus which, in the illustrated example, provides those addresses in regular succession in the form of plural bit binary "words." Since all bit channels in the illustrated apparatus are identical, only one is illustrated, that signified by the transfer lines 14, 16, for the "1" and "0" sides of the high order bit of the address word. It will be understood that any number of lower odrer bits have individual parallel transfer channels from the character generator 12, in accordance with the degree of resolution of this system. It is assumed for purposes of discussion that the present system utilizes words of three bits, and therefore a three bit decoder is shown, as will be more described hereinafter.

Additionally, the character generator 12 has a transfer timing signal output line 18, as is customary in the art of digital data processing apparatus, a pulse on line 18 serving to coordinate transfer from the character generator 12 after each new binary word becomes available on its output lines 14, 16. This timing pulse is applied through a delay circuit 20 to sample a pair of "AND" (&) circuits 22, 24 for each bit transfer channel. The application of this sampling pulse to the lower order channels is indicated at 26. The sampling of the AND circuits 24, 26 effects transfer of information from the character generator output on lines 14, 16 to storage means such as a flip-flop 28. When the next address word becomes available from the character generator on lines 14, 16, the corresponding timing pulse on line 18 is operative through another branch line 30 to sample a second pair of AND (&) circuits 32, 34 whereby the contents of the first storage flip-flop 28 is transferred to a second storage flip-flop 36. The same operation occurs with respect to the lower order bits, as indicated at 38. Shortly after the contents of flip-flop 28 have been transferred in this manner to flip-flop 36, the same timing pulse, having been delayed at circuit 20 is effective to store the corresponding bit of the new word from lines 14, 16 in flip-flop 28. Thus, except for nearly instantaneous transition times, at any given moment the register of which flip-flop 28 is a representative contains the most recent address word to be emitted by the character generator 12, and the register of which flip-flop 36 is a representative contains the preceding address word.

In accordance with the invention, digital to analog converter means, indicated generally at 40, are provided which include means for generating analog level outputs corresponding to the absolute values of the successive address words together with a component which represents an overdrive signal corresponding to the difference of each new word relative to the preceding one, and logic means are provided which route signals to that decoder means in a manner which is effective for this purpose.

Thus, the decoder in accordance with the invention may comprise a network having a plurality of resistors R1 through R9 individually connectable from a voltage source V1 to a summing node 42 by normally open switches S1 through S6 and normally closed switches S7 through S9, respectively. The switches are controllable from their normal condition to the opposite condition by input signals applied to respective terminals T1 through T9. In the schematic representation of the system illustrated in FIG. 1, these switches are shown as relay switches for simplicity of illustration and ease of understanding, but it will be understood that in actual practice they would more usually be higher speed operating devices such as transistor switches.

It will be observed that the illustrated decoder has three times as many channels as there are information channels, the channels being three groups: R1 through R3 provide no overdrive, R4 through R6 provide positive overdrive, and R7 through R9 provide negative overdrive, as will be more fully explained. For serving this purpose, the ohmic values of the respective resistors R1 through R9 may have the following relationship:

TABLE 1

| | | |
|---|---|---|
| $R1=R$ | $R4=\frac{R}{1.5}$ | $R7=\frac{R}{1.5}$ |
| $R2=\frac{R}{2}$ | $R5=\frac{R}{3.0}$ | $R8=\frac{R}{3.0}$ |
| $R3=\frac{R}{4}$ | $R6=\frac{R}{6.0}$ | $R9=\frac{R}{6.0}$ |

It will be observed that if the content of flip-flop 28 is a "1," there will be an output on line 50 applied to terminal T3 whereby switch S3 is closed and (electronic) current flows from V1 through R3 to the summing node 42. If the corresponding bit of the previous address word, now stored in flip-flop 36, were also a "1," there will be a signal on line 52. These two signals are compared by an "Exclusive Or" $\forall$ circuit 54. There being signals on each of lines 50 and 52, the condition for an output from an "Exclusive Or" circuit is not satisfied and there is no output on line 56 of that circuit.

Thus, under the condition assumed, only switch S3 is energized by the output of the high order bit channel logic of the system, switches S6 and S9 also assigned to the channel under discussion remaining in their unenergized, open and closed states, respectively. Accordingly, the total current flowing to the summing node 42 is that which is passed by resistor R3 and resistor R9.

If the previous value of the high order bit had been a "0" it would mean that the value of the high order bit had risen and therefore it would be desirable that the positive overdrive section of the decoder 40 be employed. This is accomplished by operation of the "Exclusive Or" circuit 54 since under that condition there would be no output on line 52 of flip-flop 36 (that flip-flop having stored in it the "0" of the previous word) but there would be an output on line 50 of flip-flop 28 applied to input lines 58 of the "Exclusive Or" circuit 54. Accordingly there would be an output on line 56 of the "Exclusive Or" circuit which is applied to a pair of "AND" (&) circuits 60, 62. These "AND" circuits have their other input legs energizable from the "1" and "0" sides respectively of the current bit storage flip-flop 28. The bit stored in flip-flop 28 being a "1," a signal will be applied by a line 72 which together with the signal on lines 56, 70 will satisfy the requirement for operation of AND circuit 60. Thus, a signal will be applied by a line 64 through terminal T6 for operation of switch S6 and electronic conduction through resistor R6 from voltage supply V1 to the summing node 42.

Had the present and previous high order bits both been "0," there would be no signal on line 50 out of current bit storage flip-flop 28, nor on line 52 out of former bit storage flip-flop 36. Both of the input lines 52, 58 of "Exclusive Or" circuit 54 being "down" there would be no output on its line 56. Accordingly, neither of AND circuits 60, 62 could be energized and thus none of switches S3, S6 and S9 assigned to the high order bit channel would be energized. Accordingly, insofar as the high order bit channel is concerned, current would flow through only resistor R9, switch S9 being of the normally closed variety. This represents the quiescent status of the high order bit channel output.

If, however, even though the present status in flip-flop 28 were a "0," if the previous status of that bit, now stored in flip-flop 36, had been a "1," this would represent a negative going transition and it would be desired that the decoder output to the summing node 42, from the circuitry associated with the high order bit channel under discussion, be less than its quiescent or "0" indicative level. To accomplish this, the "1" state of the previous bit as stored in flip-flop 36 is operative through line 52 to energize the output of "Exclusive Or" circuit 54 (there being no input on line 58 to that "Exclusive Or" circuit because the present status of the bit in flip-flop 28 is now "0"). The output on line 56 of the "Exclusive Or"

circuit is applied by a line 70 together with an output on line 72 from the "0" side of flip-flop 28 to the AND circuit 62 which then applies a signal via line 74 to terminal 79. This operates to energize normally closed switch S9 to its open position so as to cut resistor R9 out of the circuit.

It will be understood that each bit channel in the apparatus, in the present illustration three, operates in the same manner and at the same time as the one just described, each in accordance with the status of the present bit of its particular order received from the character generator in the light of the change of status, if any, from the previous bit of that channel. Thus, the lower order bit channels (not shown) are operative in accordance with signals received from the character generator 12 to control inputs to terminals T2, T5, T8, and T1, T4, T7, respectively, in exactly the same manner as the high order bit channel controls inputs to terminals T3, T6, and T9 as above described. It is important to note that each bit order operates independently of all the others (though in timed relationship with the others as determined by signals on lines 26 and 38) to make individual contributions to the current at summing node 42. Thus the absolute value of the present address word received from the character generator 12 and the bit-by-bit differences between that word and the former word are utilized to operate the decoder 40 in a manner which provides a net analog output at the summing node 42 which varies in accordance with that absolute value and the direction and amount of change from the previous value. Although this change weighted and summed in an analog fashion, its character and value is first calculated digitally on a bit-by-bit basis.

The interplay of the various channels for this purpose can be visualized by reference to FIGS. 2*a* through 2*c* wherein operation of the three channels in accordance with a sequence of typical inputs is diagrammed.

Let it be assumed that the three-bit binary output of the character generator 12 varies as shown in FIG. 2*a*. The resulting switching operations indicated in FIG. 2*c* cause coresponding current variations (FIG. 2*b*) at the summing node 42. In FIG. 2*c*, the up level indicates that the switch is closed. The modulated current waveform shown in FIG. 2*b* carries indicated values of the ordinates are chosen for convenience in showing relative magnitudes. The zero level on this waveform can be considered to be superimposed upon a quiescent value resulting from current through R7, R8 and R9 (FIG. 1) and chosen to insure that the current through the yoke buffer transistor hereinafter described will always be positive.

Returning to FIG. 1, the current signal at summing node 42 is applied through a buffer transistor 80 to the electron beam deflection system of the cathode ray tube 10, this deflection system including a reactive integrating network which serves to convert the current steps supplied at the summing node 42 into nearly linear ramps. Thus the deflection system of the cathode ray tube includes a deflection control network comprising a yoke coil 84, a resistor 86 shunting the same and distributed capacity 88. The time constant of this network is made long with respect to the repetition rate of the delivery of digital words from the character generator, and the overdrive feature of the current steps serves to operate on the first steep linear portion of the characteristic curve of the network.

Thus, as shown at 90, 92, 94, 96 of FIG. 2*b*, the actual current through the inductor 84 varies in a nearly linear fashion. In that diagram, the effect of the delay 20 (FIG. 1) is shown exaggerated to serve to illustrate "no change" operation of the circuit. During the delay of communication of the timing signal on line 18, the flip-flops 26, 36 have the same value since the value has been gated from flip-flop 28 to flip-flop 36 and no new value has yet been brought into flip-flop 28. The same is true for each flip-flop pair of the corresponding registers of which these flip-flops are representative. Thus during these times the output of the circuit is always as if there is no change; in other words the change-responsive Exclusive Or circuit 54 has no output. At such times, the output at the summing node 42 is representative of the absolute value, and the reactive transient is interrupted as shown. Of course, if the next word were of the same value as the previous one this plateau would continue. Accordingly, there is never a time when more than the initial portion of the reactive time constant curve is employed, the repetitive presentation of new words and new timing signals from the character generator 12 interrupting the transient after its initial linear portion.

While the invention has been particularly shown and described with reference to a preferred embodiment thereof, it will be understood by those skilled in the art that various changes in form and details may be made therein without departing from the spirit and scope of the invention.

What is claimed is:

1. A system for generating a signal for controlling the deflection of a cathode ray tube comprising in combination a digital data source, said digital data source defining the absolute coordinate addresses of the terminal endpoints of successive vectors to be generated on the screen of said cathode ray tube, means connected to said source for detecting changes in individual bit values of the successive addresses, and digital-to-analog decoder means comprising first converter means connected to said source to be responsive to said absolute addresses and second converter means connected to said detecting means and adapted to yield a weighted analog signal component corresponding to each detected bit change, and analog summing means connected to the outputs of said first and second converter means.

2. A system for generating a signal for controlling the deflection of a cathode ray tube comprising in combination a digital data source, said digital data source defining the absolute coordinate addresses of the terminal endpoints of successive vectors to be generated on the screen of said cathode ray tube, means connected to said source for detecting changes in the values of individual bit orders of the successive addresses, digital-to-analog decoder means connected to receive address signals from said source and including means to convert said address signals to their analog equivalent, said decoder means further including means connected to the change detecting means for converting said detected changes into individually weighted step signal components corresponding to the bit order of said detected changes, integrating means, and summing means connected between said decoder means and said integrating means for applying a composite signal, comprising said analog equivalents and said step signal components for each order, to said integrating means, whereby the resulting integrated signal varies in a linear fashion between the levels specified by said coordinate addresses.

3. A system for generating a signal for controlling the deflection of a cathode ray tube comprising in combination a digital data source having a plurality of outputs for corresponding bit orders of digital values, said digital data source defining in the digital terms the absolute coordinate addresses of the terminal endpoints of successive vectors to be generated on the screen of said cathode ray tube, digital logic means connected to said source, for detecting changes in the values of the successive addresses, said digital logic means comprising parallel connected storage means for successive ones of said addresses bit by bit order and bit-by-bit comparison means connected to said storage means for detecting differences in the individual bit values of said successive addresses, decoder means including digital input control means responsive digital data source and to said logic means and analog network means under the control of said digital input means to be responsive to said absolute values and to said changes to yield signals including overdrive components corresponding to a predetermined multiple of said changes, and means including integrating means for applying said signals to an integrating circuit circuit to provide ramp signals corresponding in duration to that of said overdrive signals.

4. A system in accordance with claim 3 wherein said comparison means includes Exclusive Or circuitry for determining the presence of a change and said analog network means includes separate network paths for no change, positive change, and negative change conditions in each bit position.

5. A system in accordance with claim 4, wherein said network paths for no change comprise the combination of a first normally open circuited branch connected to be closable by said decoder means only by and during presence of a "1" value in the corresponding bit position of the most recent address, and a normally closed circuited branch operable connected to be openable by said decoder means only by and during the combination of the presence of unequal values of said bit and the corresponding bit of the previous address and the presence of a "0" value in said most recent address bit position.

6. A system in accordance with claim 4, wherein said network paths for positive change comprise the combination of a first normally open circuited branch connected to be closable by said decoder means by and during presence of a "1" value in the corresponding bit position of the most recent address, and a second normally open circuited branch connected to be closable by said decoder means by and during the combination of the presence of unequal values of said bit and the corresponding bit of the previous address and the presence of a "1" value in said most recent address bit position.

References Cited

UNITED STATES PATENTS

| | | | |
|---|---|---|---|
| 2,830,285 | 4/1958 | Davis et al. | 340—347 |
| 2,889,547 | 6/1959 | Wesley | 340—347 |
| 2,892,186 | 6/1959 | McNaney | 340—347 |
| 2,907,899 | 10/1959 | Kabell et al. | 340—347 |
| 2,970,306 | 1/1961 | Zieman et al. | 340—347 |
| 3,038,029 | 6/1962 | Carbrey | 340—347 |
| 3,281,831 | 10/1966 | Yanishevsky | 340—347 |
| 3,293,614 | 12/1966 | Fenimore et al. | 340—347 |
| 3,307,173 | 3/1967 | Popodi et al. | 340—347 |
| 3,320,409 | 5/1967 | Larrowe | 340—347 |

MAYNARD R. WILBUR, *Primary Examiner.*

DARYL W. COOK, *Examiner.*

W. J. KOPACZ, *Assistant Examiner.*

UNITED STATES PATENT OFFICE

CERTIFICATE OF CORRECTION

Patent No. 3,381,290 April 30, 1968

Edward J. Breitenbach et al.

It is certified that error appears in the above identified patent and that said Letters Patent are hereby corrected as shown below:

Column 7, line 13, cancel "to an integrating circuit circuit"; line 29, cancel "operable".

Signed and sealed this 3rd day of March 1970.

(SEAL)

Edward M. Fletcher, Jr.
Attesting Officer

WILLIAM E. SCHUYLER, JR.
Commissioner of Patents